US006565936B1

(12) United States Patent
Peiffer et al.

(10) Patent No.: US 6,565,936 B1
(45) Date of Patent: *May 20, 2003

(54) FILM LAMINATE COMPRISING A BIAXIALLY ORIENTED POLYESTER FILM WITH HIGH OXYGEN BARRIER, ITS USE AND A PROCESS FOR ITS PRODUCTION

(75) Inventors: Herbert Peiffer, Mainz (DE); Richard Lee Davis, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,168

(22) Filed: Nov. 2, 1999

(30) Foreign Application Priority Data

Nov. 3, 1998 (DE) .......................... 198 50 723
Nov. 4, 1998 (DE) .......................... 198 50 882

(51) Int. Cl.$^7$ .................. B32B 15/08; B32B 15/20; B32B 18/00; B32B 27/06; B32B 27/08; B32B 27/10; B32B 27/36; B32B 27/32; B32B 31/14
(52) U.S. Cl. .................. 428/35.9; 428/35.8; 428/36.6; 428/36.7; 428/213; 428/336; 428/347; 428/423.7; 428/446; 428/448; 428/451; 428/457; 428/458; 428/461; 428/480; 428/481; 428/483; 428/910; 264/288.4; 264/289.3; 264/290.2; 156/297; 156/299; 156/308.2; 427/532; 427/533; 427/536; 427/537; 427/569; 427/585; 427/123; 427/126.1; 427/299; 427/316; 427/322; 427/419.1; 427/419.3
(58) Field of Search .................. 428/35.7, 35.8, 428/35.9, 36.6, 36.7, 213, 346, 347, 349, 457, 458, 461, 430, 446, 448, 480, 483, 910, 332, 336, 423.7, 451, 481; 264/288.4, 289.3, 290.2; 427/532, 533, 535, 536, 537, 569, 585, 123, 126.1, 299, 316, 322, 419.1, 419.3; 156/297, 299, 308.2

(56) References Cited

U.S. PATENT DOCUMENTS

| | | |
|---|---|---|
| 3,515,626 A | 6/1970 | Duffield |
| 3,958,064 A | 5/1976 | Brekken et al. |
| 4,042,569 A | 8/1977 | Bell et al. |
| 4,252,885 A | 2/1981 | McGrail et al. |
| 4,399,179 A | 8/1983 | Minami et al. |
| 4,493,872 A | 1/1985 | Funderburk et al. |
| 4,615,939 A | 10/1986 | Corsi et al. |
| 4,622,237 A | 11/1986 | Lori |
| 5,236,680 A | 8/1993 | Nakazawa et al. |
| 5,236,683 A | 8/1993 | Nakazawa et al. |
| 5,242,757 A | 9/1993 | Buisine et al. |
| 5,429,785 A | 7/1995 | Jolliffe |
| 5,453,260 A | 9/1995 | Nakazawa et al. |
| 5,468,527 A | 11/1995 | Peiffer et al. |
| 5,506,014 A | 4/1996 | Minnick |
| 5,955,181 A | * 9/1999 | Peiffer et al. ............... 428/212 |
| 6,054,212 A | * 4/2000 | Peiffer et al. ............... 428/195 |
| 6,149,995 A | * 11/2000 | Peiffer et al. .......... 264/173.16 |
| 6,194,054 B1 | * 2/2001 | Peiffer et al. ............... 428/141 |
| 6,291,053 B1 | * 9/2001 | Peiffer et al. ............... 428/141 |
| 6,391,410 B1 | * 5/2002 | Peiffer et al. ............... 428/215 |
| 2002/0122932 A1 | * 9/2002 | Peiffer et al. ............... 428/331 |

FOREIGN PATENT DOCUMENTS

| | | |
|---|---|---|
| DE | 1694404 | 4/1971 |
| DE | 2230970 | 2/1973 |
| DE | 3801535 | 7/1988 |
| DE | 4306155 | 9/1994 |
| DE | 197 20 505 | 11/1998 |

(List continued on next page.)

OTHER PUBLICATIONS

Schmitz, Peter et al., "Films." Ullmann's Encyclopedia of Industrial Chemistry, 5th Ed., vol. A11, pp. 85–110, Sep. 1988.*

Barendrecht, W., et al., *Harze natürliche*, in Ullmann's Encyklopädie der Techn. Chemie [Ullman's Encyclopedia of Industrial Chemistry] 4$^{th}$ Ed., vol. 12, pp 525–554. (Ullman ed., 1976).

Kimura, F. et al., *FTIR Spectroscopic Study on Crystallization Process of Poly (ethylene–2,6–naphthalate)*, 35 Journal of Polymer Science: Polymer Physics 2741–2747 (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (1998).

Database WPI, Section Ch, Week 9615, Derwent Publications Ltd., London, GB; AN 96–148338, XP002114377 & JP 08036739 A (Toray Indus., Inc.) (Feb. 6, 1996).

Database WPI, Section Ch, Week 9522, Derwent Publications Ltd., London, GB; AN 95–166886, XP002114408 & JP 07 088952 A (Toray Indus., Inc.) (Apr. 4, 1995).

(List continued on next page.)

*Primary Examiner*—Vivian Chen
(74) *Attorney, Agent, or Firm*—Finnegan, Henderson, Farabow, Garrett & Dunner LLP

(57) ABSTRACT

A film laminate is disclosed and comprises a biaxially oriented polyester film and another film laminated onto the polyester film, where the polyester film comprises a base layer at least 80% by weight of which is composed of a thermoplastic polyester, at least one cover layer and a metallic or ceramic layer located on the cover layer, where the cover layer is composed of a polymer or of a copolymer or of a mixture of polymers which comprises at least 40% by weight of ethylene 2,6-naphthalate units, up to 40% by weight of ethylene terephthalate units and, if desired, up to 60% by weight of units of other aliphatic, cycloaliphatic or aromatic diols and/or carboxylic acids, with the proviso that the $T_g2$ value of the polyester film is greater than the $T_g2$ value of the base layer but smaller than the $T_g2$ value of the cover layer.

25 Claims, No Drawings

FOREIGN PATENT DOCUMENTS

| | | |
|---|---|---|
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 236 945 | 9/1987 |
| EP | 0 296 620 | 12/1988 |
| EP | 0 347 646 | 12/1989 |
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0 602 964 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 826 478 | 3/1998 |
| EP | 0 878 298 | 11/1998 |
| EP | 0 945 257 | 9/1999 |
| EP | 0 945 262 | 9/1999 |
| WO | WO 94/13476 | 6/1994 |
| WO | WO 94/13481 | 6/1994 |
| WO | WO 98/13414 | 4/1998 |
| WO | WO 98/13415 | 4/1998 |
| WO | WO 88/10188 | 12/1998 |

OTHER PUBLICATIONS

Weiss, J., *Parameters that influence the barrier properities of metallized polyester and polypropylene films*, 204 Thin Solid Films 203–216 (1991).

Patent Abstract of Japan, vol. 1998, No. 05 (Apr. 30, 1998), JP 10 00 6456 A (Toyobo).

Derwent Abstract of DE 197 20 505.

Derwent Abstract of EP 0 945 257.

Derwent Abstract of EP 0 945 262.

\* cited by examiner

FILM LAMINATE COMPRISING A BIAXIALLY ORIENTED POLYESTER FILM WITH HIGH OXYGEN BARRIER, ITS USE AND A PROCESS FOR ITS PRODUCTION

This application claims benefit under 35 U.S.C. §119 to German patent application no. 198 50 723.2, which was filed on Nov. 3, 1998, and German patent application no. 198 50 882.3, which was filed on Nov. 4, 1998. These German patent applications are incorporated by reference herein in their entirety.

The invention relates to a film laminate comprising a biaxially oriented polyester film with a base layer at least 80% by weight of which is composed of a thermoplastic polyester, and with an cover layer and a barrier layer located on the cover layer. The invention further relates to the use of the laminate and a process for its production.

BACKGROUND OF THE INVENTION

Food and drink packaging frequently requires a high level of barrier action (meaning low permeability or low permeation) with respect to gases, water vapor and flavors. A frequently used process for producing packaging of this type comprises treating the plastic films used by metallization, for example, high-vacuum vapor-deposition of aluminum. Another frequently used process involves coating the films with ceramic materials, such as $SiO_x$, $AlO_x$ or $MgO_x$. The barrier action with respect to the abovementioned substances is essentially dependent on the nature of the polymers in the film and the quality of the barrier layers applied. For example, metallized biaxially oriented polyester films have very good barrier action with respect to gases, such as oxygen and flavors. Metallized biaxially oriented polypropylene films, in turn, exhibit high water-vapor barriers.

The good barrier properties of metallized or ceramically coated films lead to their use in particular for packaging foods and other consumable items where long storage or transport times pose a risk that the packaged foods may spoil, become rancid or lose flavor if the barrier is inadequate. This applies, for example, to coffee, snacks containing fats (nuts, chips, etc.) and drinks containing carbon dioxide (in pouches).

Coated polyester films are also suitable for thermal insulation of technical devices. For example, aluminum-metallized polyester films can be used to improve insulation in refrigerators. The insulation provided by these films uses the vacuum flask principle and consists essentially of two laminates (a number of layers of aluminum-metallized polyester films) with, for example, sheets of foam welded between them. The sheets of foam, which are welded in under vacuum, server essentially as spacers between the two laminates. To maintain the required vacuum the laminates must exhibit very good oxygen barriers.

When polyester films metallized with aluminum are used as packaging material they are generally a constituent of a film composite (laminate) having two or more layers. Bags produced therefrom can be filled, for example, by a vertical tubular bag forming, filling and sealing machine. The bags are sealed on their inner side (i.e. on the side facing the contents), the sealable layer consisting, for example, of polyethylene or polypropylene. The composite film here typically has the following structure: polyester layer/aluminum layer/adhesive layer/sealable layer. For a laminate thickness of from about 50 to 150 $\mu$m the thickness of the metal layer is only from 20 to 50 nm. Even this very thin aluminum layer is sufficient to give adequate protection from light and very good barrier properties.

The oxygen barrier or oxygen permeability is generally measured not on the laminate or on the packaging itself, but on the metallized or ceramically coated polyester film. To ensure good quality of the foods or other consumable items even after relatively long storage times, the oxygen permeability (or permeation) of the metallized film may not be greater than 2 $cm^3/m^2$ bar d (no more than 2 $cm^2$ of oxygen per square meter and per day should diffuse through the film on exposure to air at a pressure of 1 bar) and in particular not greater than 1 $cm^3/m^2$ bar d. In the future, the demands of the packaging industry will head toward still higher barriers, with attempts to achieve permeability values of less than 1.0 $cm^3/m^2$ bar d.

There have been a number of reports dealing with oxygen barriers in connection with aluminum-metallized films (substrates). A detailed summary of the art in this connection can be found, for example, in the dissertation by H. Utz (Munich Technical University, 1995: "Barriereeigenschaften aluminuiumbed ampfter Kunststoffolien" [Barrier properties of aluminum-metallized plastic films], the disclosure of which is incorporated by reference herein.

There is as yet insufficient information on the detailed basis of the barrier action in the metaillized film. Important variables are clearly the substrate surface and the nature of the substrate polymer, and also its morphology. It is generally assumed that smooth surfaces give better barrier properties (cf. Utz, pp. 38 et seq.). Weiss et al., in "Thin Solids Films" 204 (1991), p. 203–216, have demonstrated that when various concentrations of titanium dioxide particles are introduced into a coating the resultant oxygen permeabilities after metallization with aluminum increase as the amount of $TiO_2$ rises. According to Utz's studies there is no direct relationship between the surface. roughness of the PET film and the oxygen barrier.

German patent application no. 19720505.4 proposes a biaxially oriented polyester film with a base layer, at least 80% by weight of which is composed of a thermoplastic polyester, and with a cover layer and a metallic or ceramic layer located on the cover layer, where the cover layer of the film is composed of a polymer or of a copolymer or of a mixture of polymers which comprises at least 40% by weight of ethylene 2,6-naphthalate units, up to 40% by weight of ethylene terephthalate units and, if desired, up to 60% by weight of units of other aliphatic, cycloaliphatic or aromatic diols and/or dicarboxylic acids, with the proviso that the $T_g2$ value of the polyester film is greater than the $T_g2$ value of the base layer but smaller than the $T_g2$ value of the cover layer. The entire disclosure of German patent application no. 19720505.4 is incorporated by reference herein.

It is an object of the present invention to provide a film laminate which exhibits a high oxygen barrier (less than 0.05 $cm^2$ of oxygen per square meter and per day should diffuse through the unlaminated base film on exposure to air at a pressure of 1 bar). The other properties of the film laminate should be at least equivalent to those of known packaging films of this type. The production of the film should also be simple and cost-effective.

DESCRIPTION OF THE INVENTION

The object is achieved by means of a film laminate comprising a biaxially oriented polyester film and another film laminated onto the biaxially oriented polyester film, wherein said biaxially oriented polyester film comprises:

(a) a base layer at least 80% by weight of which is composed of a thermoplastic polyester, (b) at least one cover layer for the base layer, and (c) a metallic or ceramic layer located on the cover layer, where the cover layer is composed of at least one polymer, at least one copolymer, or a mixture thereof, wherein said polymer or copolymer comprises at least 40% by weight of ethylene 2,6-naphthalate units, up to 40% by weight of ethylene terephthalate units, and from 0 to 60% by weight of units chosen from one or more aliphatic diols, cycloaliphatic diols, aromatic diols, aliphatic dicarboxylic acids, cycloaliphatic dicarboxylic acids, and aromatic dicarboxylic acids that are not ethylene 2,6-naphthalate or ethylene terephthalate, with the proviso that the $T_g2$ value of the biaxially oriented polyester film is greater than the $T_g2$ value of the base layer but smaller than the $T_g2$ value of the cover layer.

Another difference from the art, in relation to the base films, is that the glass transition temperature $T_g$ of the copolymer or, respectively of the copolymers of the cover layer(s) is higher than the glass transition temperature $T_g$ of the polymers of the base layer. The glass transition temperature of the copolymers used for the cover layer(s) is preferably from 80 to 102° C. When the glass transition temperatures are determined using DSC the transitions of the two layers cannot be separately distinguished.

Due to crystallinity and molecular stresses in the amorphous fraction of the specimens, glass transition temperatures (termed $T_g1$ herein) determined in the first heating procedure on biaxially oriented, heat-set films are relatively small in size, distributed across a wide temperature range and shifted toward higher temperatures. Because of orientation effects in particular they are not suitable for characterizing the polymer. The resolution of DSC analyzers is often insufficient to detect the glass transitions in the first heating procedure ($T_g1$) of the individual layers of the base film, the transitions being "blurred" and small in size as a result of orientation and crystallinity. If the specimens are melted and then rapidly cooled again to below their glass transition temperature (quenched), the orientation effects are eliminated. The glass transitions measured on renewed heating (designated $T_g2$ here) then have greater intensity and are characteristic of the respective polymers. However, even here it is not possible to distinguish separately the glass transitions of the individual layers, since the layers mix on melting and the polyesters present in them enter into transesterification reactions with one another. However, it is fully sufficient to compare the $T_g2$ of the entire coextruded films with the $T_g2$ of the polymer used for the base layer. In known films (where, for example, the cover layer comprises isophthalic acid) the $T_g2$ value of the base layer is higher than that of the coextruded film, whereas the $T_g2$ value of the cover layer is lower than that of the base layer and also than that of the coextruded film. Exactly the opposite of this applies for the base film of novel laminate. Here, the $T_g2$ value of the coextruded film is higher than that of the base layer but lower than the $T_g2$ value of the cover layer.

Preference is given to a polyester film in which the polymers of the cover layer comprise at least 65% by weight of ethylene 2,6-naphthalate units and up to 35% by weight of ethylene terephthalate units. Particular preference is in turn given to a polyester file of this type in which the polymers of the cover layer comprise at least 70% by weight of ethylene 2,6-naphthalate units and up to 30% by weight of ethylene terephthalate units.

Examples of other suitable aliphatic diols are diethylene glycol, triethylene glycol, aliphatic glycols of the formula HO—$(CH_2)_n$—OH, where n is an integer from 3 to 6, (in particular 1,3-propanediol, 1,4-butanediol, 1,5-pentanediol and 1,6-hexanediol) and branched aliphaitic glycols having up to 6 carbon atoms, and cycloaliphatic diols having one or more rings which optionally contain one or more heteroatoms. Among the cycloaliphatic diols mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanedioic acids are particularly suitable, and the alkane moiety may be straight-chain or branched.

Each cover layer preferably comprises at least 35% by weight of ethylene glycol units and naphthalene-2,6-dicarboxylic acid units. Furthermore, the atmospheric oxygen diffusion through the film per square meter and day at a pressure of 1 bar should be less than 0.05 $cm^3$, preferably less than 0.03 $cm^3$, particularly preferably less than 0.01 $cm^3$.

The present invention also provides a process for producing this film laminate. This comprises a. producing a polyester film comprising base layer and one or more cover layers by coextrusion, b. biaxially orienting the polyester film, c. heat-setting the oriented polyester film, d. applying a metallic or ceramic layer onto the heat-set polyester film, and e. laminating another film onto the metallic or ceramic layer applied in step d).

To produce the cover layer it is useful to use pellets of polyethylene terephthalate and polyethylene 2,6-naphthalate in the desired mixing ratio and feed these directly to an extruder. At about 300° C. and with a residence time of about 5 min the two materials can be melted and extruded. Under these conditions transesterification reactions can take place in the extruder, forming copolymers from the homopolymers.

The polymers for the base layer are usually fed via another extruder. Any foreign bodies or contamination present may be filtered off from the polymer melt prior to extrusion. The melts are then extruded through a coextrusion die to give flat melt films and laid one upon the other. The coextruded film is then drawn off and solidified with the aid of a cooling roll and, if desired, other rolls.

The biaxial orientation process is generally sequential. For this, the first orientation is preferably longitudinal (i.e. in the machine direction) and this is followed by transverse orientation (i.e. perpendicular to the machine direction). This orients the molecular chains. Longitudinal stretching can be carried out with the aid of two rolls running at different speeds corresponding to the stretching ratio desired. Transverse stretching is generally performed using an appropriate tenter frame.

The temperature at which the orientation process is carried out may vary over a relatively wide range, and depends on the film properties desired. The longitudinal stretching is generally carried out at from 80 to 130° C., and the transverse stretching is generally performed at a temperature ranging from 90 to 150° C. The longitudinal stretching ratio is generally from 2.5:1 to 6:1, preferably from 3:1 to 5.5:1. The transverse stretching ratio is generally from 3.0:1 to 5.0:1, preferably from 3.5:1 to 4.5:1.

Prior to the transverse stretching process, one or both surfaces of the film may be in-line coated by known processes. The in-line coating may, for example, give better adhesion of the metal layer or of any printing ink applied, but may also serve to improve antistatic performance or processing performance.

In the heat-setting which follows, the film is held at a temperature of from 150 to 250° C. for from about 0.1 to 10 seconds. The film is then wound up in a usual manner.

One or both surfaces of the biaxially oriented and heat-set polyester film may be corona- or flame-treated, or both corona- and flame-treated, prior to application of the $O_2$-barrier layer. The treatment intensity selected is such that the surface tension of the film is generally above 45 mN/m.

The application of the $O_2$-barrier layer, in particular of the metal layer or of the ceramic layer, usually takes place in widely used industrial systems. Aluminum layers are usually produced by vapor-deposition, while ceramic layers may also be produced using electron-beam processes or by sputtering. The process parameters for the system during application of the metal or ceramic layer to the films correspond to standard conditions. Metallization of the films is preferably carried out in such a way that the optical density of the metallized films is in the usual range of from about 2.2 to 2.8. The application of the ceramic layer to the film is preferably carried out in such a way that the thickness of the oxide layer is in the range from 10 to 100 nm. The web speed of the film to be coated is from 5 to 10 m/s in all cases. A laboratory metallization system is not used for the metallization, since experience has shown that the barrier values are then significantly higher and cannot be utilized for comparative purposes.

A great advantage of this process is that the extruder can be fed with pellets, which do not cause blocking of the machine.

At least 90% by weight of the base layer of the film is preferably composed of the thermoplastic polyester. Polyesters suitable for this are made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), or also from ethylene glycol, naphthalene 2,6-dicarboxylic acid and biphenyl-4,4'-dicarboxylic acid (=polyethylene 2,6-naphthalate bibenzoate, PENBB). Particular preference is given to polyesters at least 90 mol % of which, preferably at least 95 mol %, are composed of ethylene glycol units and terephthalic acid units or of ethylene glycol units and naphthalene-2,6-dicarboxylic acid units. The remainder of the monomer units are derived from other aliphatic, cycloaliphatic or aromatic diols or dicarboxylic acids which can also be present in the cover layer.

The polyesters may be prepared by the transesterification process. The starting materials for this are dicarboxylic esters and diols, and these are reacted using the usual transesterification catalysts, such as salts of zinc, of calcium, of lithium or of manganese. The intermediates are then polycondensed in the presence of widely used polycondensation catalysts, such as antimony trioxide or titanium salts. The preparation may equally well be carried out by the direct esterification process in the presence of polycondensation catalysts, starting directly from the dicarboxylic acids and the diols.

It has proven useful for the processing of the polymers to select the polymers for the base layer and the cover layer(s) in such a way that there is no great difference between the viscosities of the respective polymer melts. Otherwise, flow problems or streaking on the finished film are likely. A modified solution viscosity (SV) is used to describe the viscosity ranges of the two melts. The SVs of commercially available polyethylene terephthalates suitable for producing biaxially oriented films are from 600 to 1000. To ensure satisfactory film quality the SV of the copolymers for the cover layer should be from 500 to 1200. If desired, a solid-phase condensation may be carried out on the respective pellets in order to achieve the required SVs for the materials. As a general rule the SVs of the polymer melts for the base layer and cover layer(s) should not differ by more than 200, preferably by not more than 100.

The polymers for the cover layer may be prepared in 3 different ways:

a) In a joint polycondensation, terephthalic acid and naphthalene-2,6-dicarboxylic acid are charged to a reaction vessel together with ethylene glycol, and polycondensed using the usual catalysts and stabilizers to give a polyester. The terephthalate units and naphthalate units are then randomly distributed in the polyester.

b) Polyethylene terephthalate (PET) and polyethylene 2,6-naphthalate (PEN), in the desired ratio, are melted together and mixed. This may be done either in a reaction vessel or preferably in a melt kneader (twin-screw kneader) or extruder. Immediately after melting, transesterification reactions begin between the polyesters. Initially block copolymers are obtained, but as reaction time increases—depending on the temperature and the mixing action of the agitator—the blocks become smaller, and if the reaction time is long a random copolymer is obtained. However, it is not necessary and also not always advantageous to wait until the distribution is random, since the desired properties are also obtained from a block copolymer, The resultant copolymer is then extruded from a die and pelletized.

c) PET and PEN pellets in the desired ratio are mixed and the mixture is fed to the extruder for the cover layer. In this case the transesterification to give the copolymer takes place directly during production of the film. An advantage of this process is that it is very cost-effective. It generally gives block copolymers, where the block length depends on the extrusion temperature, the mixing action of the extruder and the residence time in the melt.

In a preferred embodiment, from 0.1 to 20% by weight of the polymers of the base layer are identical with those of the cover layer. These are either admixed with the base layer directly during extrusion or are in any case present in the film due to addition of recycled material. The proportion of these copolymers in the base layer is selected in such a way as to give the base layer crystalline character.

In another embodiment, the film encompasses, on the side facing away from the cover layer, another cover layer made from polyethylene terephthalate, and this layer, like the cover layer to be metallized or ceramically coated, may comprise pigments.

The base film exhibits a surprisingly high oxygen barrier. If, in contrast, the polymers used for the cover layer(s) to be coated comprise less than 40% by weight of ethylene 2,6-naphthalate units and more than 40% by weight of ethylene terephthalate units, the film is then in many cases somewhat less permeable to oxygen than a metallized or coated standard polyester film (consisting of 100% by weight of polyethylene terephthalate), but the permeability is still far too high In fact it has been found that the oxygen barrier is poorer than for a metallized or ceramically coated standard polyester film if the cover layer comprises from 30 to 40% by weight of ethylene 2,6-naphthalate units and from 60 to 70% by weight of ethylene terephthalate units. Even under these circumstances, however, there can be advantage in a film having an cover layer which comprises from 5 to 40% by weight of ethylene 2,6-naphthalate units and more than 40% by weight of ethylene terephthalate units if the oxygen barrier is not a decisive factor in the intended application.

The required good oxygen barrier is not achieved if the $O_2$-barrier layer has been applied to the side of the base layer facing away from the cover layer (and not to the cover layer itself). This applies even if in other respects the compositions of the base layer and cover layer correspond to the base film described above.

The base layer and the cover layer(s) may also comprise conventional additives, such as stabilizers and antiblocking agents. They are usefully added to the polymer or to the polymer mixture prior to melting. Examples of stabilizers used are phosphorus compounds, such as phosphoric acid or phosphate esters. Typical antiblocking agents (also termed pigments in this context) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc or manganese salts of the dicarboxylic acids used, carbon black, titanium dioxide, kaolin, crosslinked polystyrene particles and crosslinked acrylate particles.

Other additives which may be selected are mixtures of two or more different antiblocking agents or mixtures of antiblocking agents of the same composition but of different particle size. The particles may be added to the individual layers in the usual concentrations, e.g. as a glycolic dispersion during the polycondensation or via masterbatches during the extrusion. Pigment concentrations which have proven particularly suitable are from 0.0001 to 5% by weight. A detailed description of antiblocking agents can be found, for example, in EP-A-0 602 964, the relevant disclosure of which is incorporated by reference herein.

To achieve other desired properties, the film may be coated or corona- or flame-pretreated. Typical coatings are layers with adhesion-promoting, antistatic, slip-improving or release properties. One way of applying these additional layers to the film is by in-line coating using aqueous dispersions prior to the transverse orientation procedure.

The polyester film preferably also comprises a second cover layer. The structure, thickness and composition of the second cover layer may be selected independently of the cover layer already present, and the second cover layer may likewise comprise the abovementioned polymers or polymer mixtures, but these do not have to be identical with those of the first cover layer. A second cover layer may also comprise other widely used cover layer polymers.

If desired there may also be an intermediate layer between the base layer and the cover layer(s). This may be composed of the polymers described for the base layer. In a particularly preferred embodiment it is composed of the polyester used for the base layer. It may also comprise the conventional additives described. The thickness of the intermediate layer is generally greater than 0.3 $\mu$m, preferably from 0.5 to 15 $\mu$m, in particular from 1.0 to 10 $\mu$m.

The thickness of the cover layer(s) is generally greater than 0.1 $\mu$m, preferably from 0.2 to 5 $\mu$m, in particular from 0.2 to 4 $\mu$m, and the cover layers may have identical or different thicknesses.

The total thickness of the polyester film may vary within wide limits and depends on the intended application. It is preferably from 4 to 100 $\mu$m, in particular from 5 to 50 $\mu$m, particularly preferably from 6 to 30 $\mu$m, and the base layer preferably makes up a proportion of from about 40 to 90% of the total thickness.

The $O_2$-barrier layer is preferably composed of aluminum. However, other materials which can be applied as thin coherent layers are also suitable. An example of a particularly suitable material is silicon, which unlike aluminum gives a transparent barrier layer. The ceramic layer is preferably composed of oxides of elements of the $2^{nd}$, $3^{rd}$ or $4^{th}$ main group of the Periodic Table, in particular oxides of magnesium, of aluminum or of silicon. Use is generally made of metallic or ceramic materials which can be applied at reduced pressure or under vacuum. The thickness of the layer applied is generally from 10 to 100 nm.

The second film subsequently laminated onto the base film is applied by known processes by bringing together the two film webs. For this, the second film is applied to that surface of the base film which has been functionalized by coating with metal or ceramic. Examples of second films are paper and films made from thermoplastic material. Thermoplastic materials which may be used are the usual polymers used in the packaging sector, such as sealable polyesters (e.g. isophthalic-acid-containing polyethylene terephthalates), polyolefins, such as polyetylene, polypropylene and polybutylene, copolymers of these, polyamides, polyvinylchloride (PVC) or the like.

An advantage is that the production costs for the novel film laminates are not significantly higher than those for a film made of standard polyester raw materials. The other properties of the novel film laminates relevant to their processing and use remain essentially unchanged or are even improved. In addition, the invention provides for the production of the base, film to use recycled material at concentrations of from 20 to 50% by weight, based on the total weight of the film, without any significant adverse effect on the physical properties of the film laminate.

The film laminate is highly suitable for packaging foods and other consumable items which could be damaged by light and/or by air. Specifically, it is suitable for producing vacuum packs for coffee, in particular for ground coffee. In addition, it is suitable for producing insulating materials, e.g. the insulating sheets described at, the outset for use in refrigerators.

The invention may be embodied in other specific forms and those skilled in the art will recognize that various changes and modifications can be made without departing from the spirit or essential characteristics thereof. The present embodiment is, therefore, considered in all respects as illustrative and not restrictive. Embodiments are measured by the scope of the appended claims rather than by the foregoing description, and all changes which come within the meaning and range of equivalency of the claims are therefore intended to be embraced therein.

We claim:

1. A film laminate comprising a biaxially oriented polyester film and another film laminated onto the biaxially oriented polyester film, wherein said biaxially oriented polyester film comprises:

(a) a base layer at least 80% by weight of which is composed of a thermoplastic polyester, (b) at least one cover layer for the base layer, and (c) a metallic or ceramic layer located on the cover layer, where the cover layer is composed of at least one polymer, at least one copolymer, or a mixture thereof, wherein said polymer or copolymer comprises at least 40% by weight of ethylene 2,6-naphthalate units, up to 40% by weight of ethylene terephthalate units, and from 0 to 60% by weight of units chosen from one or more aliphatic diols, cycloaliphatic diols, aromatic diols, aliphatic dicarboxylic acids, cycloaliphatic dicarboxylic acids, and aromatic dicarboxylic acids that are not ethylene 2,6-naphthalate or ethylene terephthalate, with the proviso that the $T_g2$ value of the biaxially oriented polyester film is greater than the $T_g2$ value of the base layer but smaller than the $T_g2$ value of the cover layer.

2. The film laminate as claimed in claim 1, wherein said polymer or copolymer comprises at least 65% by weight of ethylene 2,6-naphthalate units and up to 35% by weight of ethylene terephthalate units.

3. The film laminate as claimed in claim 2, wherein said polymer or copolymer comprises at least 70% by weight of ethylene 2,6-naphthalate units and up to 30% by weight of ethylene terephthalate units.

4. The film laminate as claimed in claim 1, wherein the cover layer has a thickness ranging from 0.1 to 5 µm.

5. The film laminate as claimed in claim 4, wherein the thickness of the cover layer ranges from 0.2 to 4.5 µm.

6. The film laminate as claimed in claim 5, wherein the thickness of the cover layer ranges from 0.3 to 4 µm.

7. The film laminate as claimed in claim 1, wherein the cover layer comprises one or more pigments.

8. The film laminate as claimed in claim 1, wherein the biaxially oriented polyester film has an additional cover layer on the surface of the base layer facing away from the metallic or ceramic layer.

9. The film laminate as claimed in claim 8, wherein the additional cover layer comprises pigments.

10. The film laminate as claimed in claim 1, wherein the biaxially oriented polyester film further comprises an intermediate layer located between the base layer and at least one of the cover layers.

11. The film laminate as claimed in claim 1, wherein said metallic or ceramic layer located on the cover layer is a metallic layer having an optical density ranging from 2.2 to 2.8.

12. The film laminate as claimed in claim 1, wherein said metallic or ceramic layer located on the cover layer is composed of aluminum, silicon, $SiO_x$, $AlO_x$, or $MgO_x$.

13. The film laminate as claimed in claim 1, wherein the film laminated onto the biaxially oriented polyester film is sealable.

14. The film laminate as claimed in claim 1, wherein the film laminated onto the biaxially oriented polyester film is paper or is composed essentially of an isophthalic-acid-containing polyester, a polyolefin homopolymer, a polyolefin copolymer, a polyamide, or polyvinylchloride.

15. A process for producing the film laminate as claimed in claim 1, comprising the steps of:

a) producing a polyester film comprising base layer and one or more cover layers by coextrusion, b) biaxially orienting the polyester film, c) heat-setting the oriented polyester film, d) applying a metallic or ceramic layer onto the heat-set polyester film, and e) laminating another film onto the metallic or ceramic layer applied in step d).

16. The process as claimed in claim 15, wherein said biaxially orienting step is performed by first orienting the polyester film along a first axis, and then orienting the polyester film along a second axis.

17. The process as claimed in claim 15, wherein said biaxially orienting step is performed by first orienting the polyester film by longitudinal stretching, and then orienting the polyester film by transverse stretching.

18. The process as claimed in claim 17, wherein the longitudinal stretching is performed at a first temperature ranging from 80 to 130° C. and the transverse stretching is performed at a second temperature ranging from 90 to 150° C.

19. The process as claimed in claim 17, wherein the longitudinal stretching is performed at a longitudinal stretching ratio ranging from 2.5:1 to 6:1, and the transverse stretching is performed at a transverse stretching ratio ranging from 3.0:1 to 5.0:1.

20. The process as claimed in claim 19, wherein the longitudinal stretching ratio ranges from 3:1 to 5.5:1, and the transverse stretching ratio ranges from 3.5:1 to 4.5:1.

21. The process as claimed in claim 15, wherein the heat-setting step comprises holding the polyester film at a temperature ranging from 150 to 250° C. for a time ranging from 0.1 to 10 seconds.

22. The process as claimed in claim 15, further comprising the step of:

in-line coating of the heat-set polyester film prior to the applying of a metallic or ceramic layer.

23. The process as claimed in claim 15, further comprising the step of:

treating one or both surfaces of the heat-set polyester film, wherein said treating comprises corona-treatment, flame-treatment, or a combination of corona-treatment and flame-treatment.

24. A method for packaging a consumable item, comprising the step of:

enclosing a consumable item in the film laminate as claimed in claim 1.

25. The method of claim 24, wherein the consumable item is food.

* * * * *